United States Patent [19]
Jagusch et al.

[11] Patent Number: 5,938,522
[45] Date of Patent: Aug. 17, 1999

[54] BACON HANGER

[75] Inventors: Wayne E. Jagusch, Arlington Heights; Donald Vegas, Chicago, both of Ill.

[73] Assignee: Beacon Inc., Hillside, Ill.

[21] Appl. No.: 09/079,949

[22] Filed: May 15, 1998

[51] Int. Cl.$^6$ ................................................. A22C 15/00
[52] U.S. Cl. ............................................................ 452/193
[58] Field of Search ............................................. 452/193

[56] References Cited

U.S. PATENT DOCUMENTS

| | | | |
|---|---|---|---|
| 1,825,879 | 10/1931 | Louthian | 452/193 |
| 3,090,990 | 5/1963 | Graper | 452/193 |
| 4,172,305 | 10/1979 | Henebry et al. | 452/193 |
| 5,423,721 | 6/1995 | Roush et al. | 452/193 |

*Primary Examiner*—Willis Little
*Attorney, Agent, or Firm*—McAndrews, Held & Malloy, Ltd.

[57] ABSTRACT

A hanger designed for supporting pork bellies during handling and processing into slabs of bacon which is characterized by a generally rectangular base frame with a top bar and a bottom bar, and a series of generally L-shaped prong members attached to the base frame and defining a prong assembly extending laterally from the base frame. The prong members are attached to the bottom bar opposite the side of the prong assembly. The bottom bar includes an offset extending laterally from the base frame in a direction opposite the prong assembly. The offset is designed to receive the latch of a mechanical device for removal of the hanger from the pork bellie.

16 Claims, 4 Drawing Sheets

5,938,522

BACON HANGER

BACKGROUND OF THE INVENTION

This invention relates to equipment for supporting and handling articles, particularly meat products, in manufacturing and processing operations and is more particularly concerned with improvements in bacon hangers or combs for supporting pork bellies during processing to form slabs of bacon.

In the slaughtering or butchering of hogs the various portions or cuts into which the animal carcass is divided are prepared for marketing by meat packers and processors according to the type of cut and the form in which it is desired to present it to the consumer. Generally, cuts known as pork bellies are processed by suspending them for a predetermined time in a processing area, such as a smoke house, or similar curing area, where they are converted into slabs of bacon which may be supplied to the consumer in a solid piece or cut into slices after sizing and packaged to provide the familiar sliced bacon package.

In the conventional butchering and processing operation, pork bellies are transported from the butchering or cutting area to an area where they are located on bacon hangers which serve to support the bellies on a tree or rack while they are being processed. When the processing or curing is completed, the bacon slabs are removed from the hangers enabling reuse of the latter.

The bacon hangers which have been provided heretofore have been formed with pointed prongs or teeth arranged as in a comb and mounted on a frame depending from a bracket member which is shaped or otherwise formed for engaging an overhead rail, track bar, smokestick or the like. Generally, the hangers have been constructed so that the hanger teeth or prongs can be readily inserted into the relatively soft area along the top ends of the bellies by holding the bellies and pressing the teeth into the same, with some portion of the frame serving as a handle for gripping it while guiding the teeth into the meat. During processing the meat loses moisture, shrinks and tends to solidify and become firm, with resulting tightening around the teeth or prongs which makes it difficult to withdraw the prongs so as to separate the processed slabs from the hangers. Generally, the hangers have been grasped at one end and pulled, while the bacon slab is held, so as to progressively work the prongs loose from the bacon causing repetitive stress on the hands, wrists and arms of the person removing the hanger resulting in possible physical injury. Such removal also frequently results in damage to the hanger because the prongs can be bent and sometimes broken loose from the hanger thus leaving a prong in the slab which can create a hazard during slicing where contact with high speed knives can result in serious damage to the knives and possible injury to personnel in the vicinity of the slicing machine. Such hangers of the prior art are described in U.S. Pat. No. 4,172,305. Consequently, there is a well recognized need for an improved bacon hanger that will greatly reduce the incidence of prong breakage and that can be utilized in the mechanical removal of the hanger from the meat slab.

It is a general object of the present invention to provide an improved hanger structure for use in handling cuts of meat, particularly pork bellies, following butchering operations and during subsequent handling and processing operations.

It is a more specific object of the invention to provide a new and improved hanger structure which is especially adapted for suspending pork bellies and removal of the hanger from the bellies so as to facilitate handling and processing to convert the bellies into slabs of bacon.

A further object of the invention is to provide an improved hanger structure of the type having a plurality of spaced prongs in comb-like arrangement for insertion in pork bellies and removal from pork bellies or similar cuts so as to support the same during handling and/or processing wherein the hanger is provided with a grip member or series of grip members which are arranged relative to the prongs so as to enable engagement by a mechanical device that is adapted for withdrawing the prongs from the meat when it is processed and the resistance to withdrawal of the prongs has greatly increased.

Another object of the invention is to provide a hanger structure for handling meat cuts which is characterized by a series of meat engaging prongs mounted on a supporting frame and constructed so as to minimize any tendency of the prongs to break loose from the supporting frame when the frame is mechanically manipulated to withdraw the prongs from engagement in the meat.

Still another object of the invention is to provide an improved bacon hanger structure having meat penetrating prongs arranged to extend in a plane at an angle to the plane of an elongate support frame, with the frame being adapted to be disposed vertically and the prongs constituting end portions of leg formations on rod members which are bent into "U" shape and which are part of the vertically disposed support frame or which are secured to the support frame by the portions of the leg formations which adjoin the bight forming portion of the "U" shape.

The invention comprises an elongate support frame adapted to be disposed in a generally vertical plane and in depending relation from a support bracket, with a plurality of spaced article engaging prongs extending generally normal to the plane of the frame and a grip forming member or members secured to the support frame, preferably having all weld positions under compression while under stress caused by the weight of the bellie and/or stress caused by the engagement of a mechanical device used to extract the hanger prongs from the processed pork bellie. The grip forming member or members are integral with the cross bar that is welded on the prong side of the hanger frame and prongs. The cross bar has an offset or series of offsets allowing clearance for a mechanical gripping device to grip the hanger for removal of the prongs from the meat. These offsets constitute the grip forming members of the present invention.

The aforesaid and other objects and advantages of the invention will become more apparent upon consideration of the preferred form of the hanger structure which is illustrated in the accompanying drawings wherein like parts are identified by the same numerals throughout the views.

DESCRIPTION OF THE PREFERRED EMBODIMENT OF THE INVENTION

Figure 1:
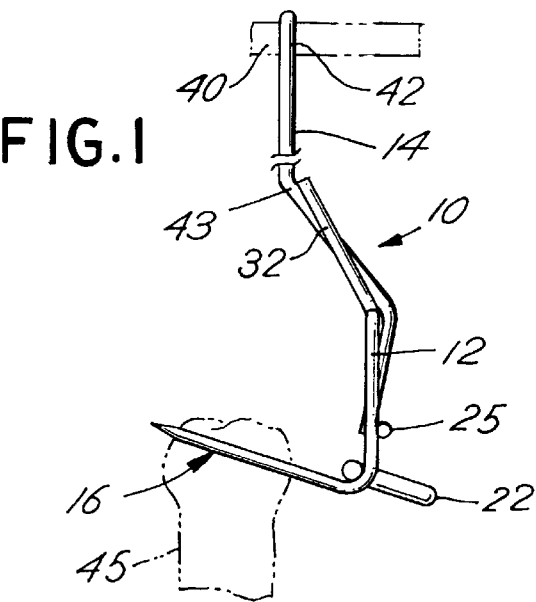
FIG. 1 is an end view of a hanger structure which is particularly adapted for use in suspending cuts of meat in a processing area with the hanger being shown in the position it will assume when mounted on an overhead support bar or track member.

As illustrated in the drawings the hanger 10 is designed particularly for use in suspending pork bellies for transport to an area for processing or curing, such as a smoke house. The hanger is designed so that it may be hung on a tree, in a cage, on a truck, rail or rack and moved to or through the processing area or system where it may be supported in the same manner or carried on a conveyor, or the like, during the processing and subsequent handling.

To the extent that the hangers depicted in the accompanying Figures retain common or comparable elements from Figure to Figure, the same reference numerals will be applied to such elements, which will not always be separately explained for such Figure.

Figure 2:
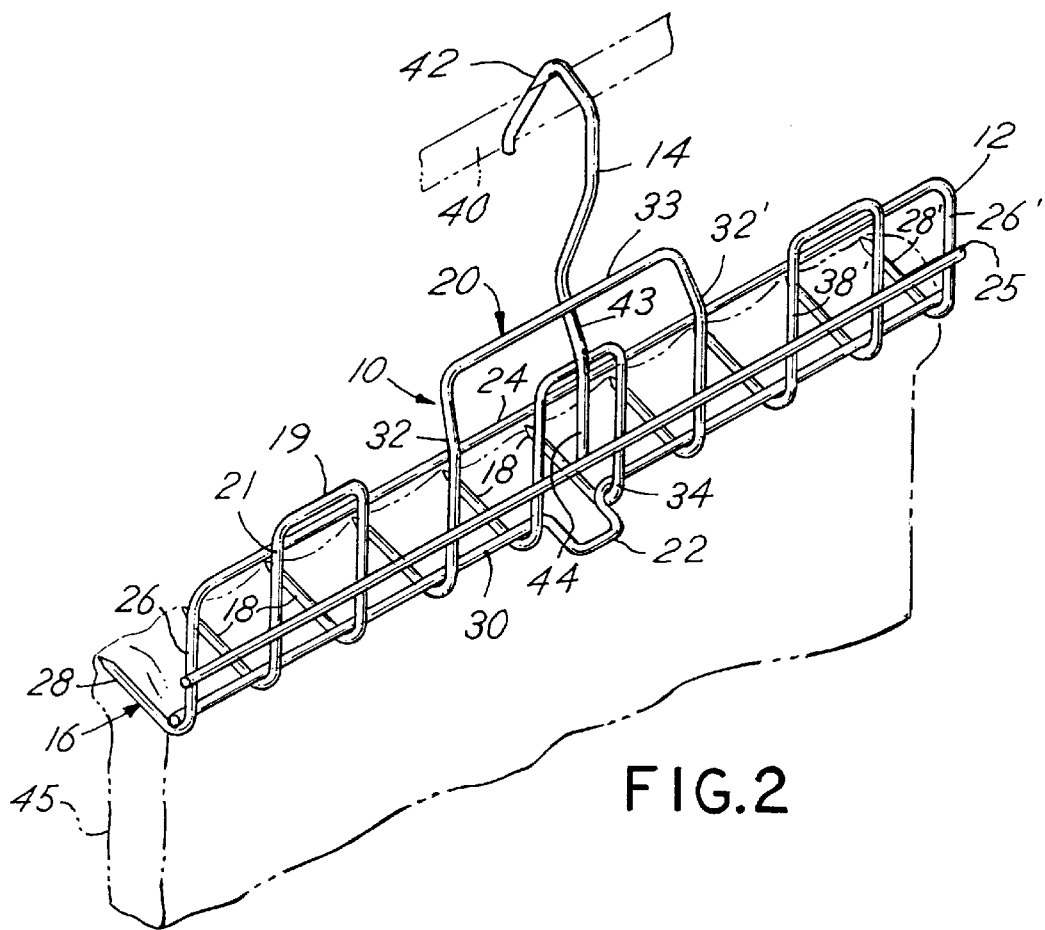
FIG. 2 is a perspective view of the hanger structure of FIG. 1, with a pork bellie being shown in phantom line so as to illustrate the use of the hanger and illustrating the compression of all weld positions while the hanger is under the load of a pork bellie, in the handling of pork bellies which are processed to form slabs of bacon.

Referring to FIGS. 1 and 2, the hanger 10 of the present invention comprises an elongate supporting frame 12 which is secured in vertically disposed depending relation on a hook-forming bracket 14 and which carries a prong assembly 16 of meat engaging prongs 18, which are arranged after the fashion of teeth in a comb, and which extend in a common plane in a generally normal direction from one side of the vertical support frame 12 and along the bottom thereof. In addition to the hook-forming bracket 14, the support frame 12 is provided with a hand-gripping member 20 extending above the top of the support frame 12 and in a plane inclined from the plane of the support frame 12 and slightly in the direction of the prong assembly 16. The support frame 12 includes a crossbar 25 that is attached to the backside of leg formations 26, 26' at about their midpoint and a bottom bar member 30 that is attached to the front side of the leg formations 26, 26' at their lower end. An offset 22 is provided on the bottom bar member 30. The offset 22 extends at the bottom of the support frame 12 in the direction opposite the direction of the prongs 18 in the assembly 16.

The several elements of the hanger structure 10 in the form illustrated are fabricated from lengths of metal rod material, of suitable gauge, which are bent as shown and joined or connected by welding, or secured to each other in a similar manner. Preferably, the rod or bar material will be stainless steel so as to afford the most desirable sanitation during use.

The elongate support frame 12 is formed by bending a length of rod stock into a U-shape so as to form a relatively long bight portion, which serves as the top bar 24 of the support frame 12, and leg formations 26, 26' which are further bent intermediate their ends so as to provide the end prongs 28, 28' in the prong assembly 16. The end prongs 28, 28' extend in a plane at an angle slightly less than normal to the plane of the support frame 12. The crossbar 25 and the bottom bar member 30 connect the two leg formations 26, 26' and are in spaced parallel relation below the top bar 24 so as to form the generally rectangular frame support for the meat engaging prong assembly 16.

The prongs 18 intermediate the two end prongs 28, 28' are formed in pairs and attached to the support frame 12. Each pair thereof is formed from a section or length of rod or bar stick by bending it into U-shape so as to provide a bight portion 19 and spaced parallel leg formations 21. The leg formations 21 are further bent intermediate their ends to provide a pair of prongs 18. The prongs 18 extend in a plane at an angle to the plane of the balance of the member which is secured on the support frame 12 so that portions of the legs formations 21 adjoining the bight portion 19 span the area between the top bar 24, the crossbar 25, and the bottom bar member 30 of the support frame 12. The leg formations 21 are preferably attached to the backside of the top bar 24, the prongside of crossbar 25, and the backside of the bottom bar member 30.

In the form shown in FIG. 2, three pairs or sets of the prongs 18 are fashioned in this manner and secured to the frame 12 with the prongs 18 constituting part of the assembly 16. A different number of prongs may be used. The grip or handle 20 is formed by bending a section or length of bar or rod material into a U-shaped configuration with spaced apart leg formations 32, 32' which are further bent to provide a pair of the prongs 18 and the assembly is mounted on the frame bars or rods 24, 25, 30. Specifically, the leg formations 32, 32' are attached to the backside of top bar 24, the prongside of the crossbar 25 and the backside of the bottom bar member 30. The bight portion 33 which forms the grip or handle 20 is spaced above the top frame bar 24 a sufficient distance to accommodate the fingers in grasping the same and may be bent out of the plane of the frame 12, as shown, in the direction of the prong assembly 16 to provide a better balance in handling.

The bottom bar member 30 is welded to the prong side of leg formations 26, 26', 32, 32' and the U-shaped members that form the remaining prongs 18. The bottom bar member is welded at or near the point where the leg formations 26, 26', 32, 3' and the U-shaped members bend from the vertical to the horizontal. Bottom bar member 30 includes the offset 22 which extends opposite from the prong side of the hanger 10. The offset 22 is configured for receiving a latch (not shown) of a mechanical gripping device (not shown). That is, a mechanical gripping device may engage the offset 22 to pull the hanger 10 away from the pork bellie, shown in phantom at 45, thereby eliminating the need for direct human grasping of the hanger and working the hanger out of the pork bellie 45.

The hook-forming bracket 14, which is provided to mount the support frame 12 on a rack or support bar, indicated in phantom line at 40, is formed from a length or section of bar or rod stock which is best shown to provide a downwardly opening hook 42 at the top and a straight terminal end section 44 for spanning the space between the top bar 24 and crossbar 25 with an intermediate portion 43 bent to position the hook 42 in a vertical plane offset from the plane of the frame 12 for better balance in handling. The intermediate portion 43 is preferably attached to the prongside of bight portion 33 of hand-gripping member 20 and the backside of the bight portion 19 of the middle U-shaped member 34. The end section 44 is preferably attached to the prongside of crossbar 25.

In the form shown in FIG. 2, the angle of the prongs 18 relative to the angle of the hook 42 is so determined to have the prongs in a plane at a slight angle above horizontal. When a bellie is on the hanger this eliminates the probability of the bellie slipping off the hanger.

In using the hanger 10, one or more pork bellies 45 may be suspended depending upon their size relative to the size of the hanger 10. The prong assembly 16 may be conveniently engaged in the top marginal portion of the meat while the user grasps the hanger grip member 20. When the withdrawal of the prong assembly 16 is desired it is facilitated by utilizing a mechanical gripping device (not shown) to engage the offset 22 and pull in the direction away from the pork bellie 45 thereby exerting a direct withdrawal force substantially in the plane of the prong assembly 16.

Figure 3:
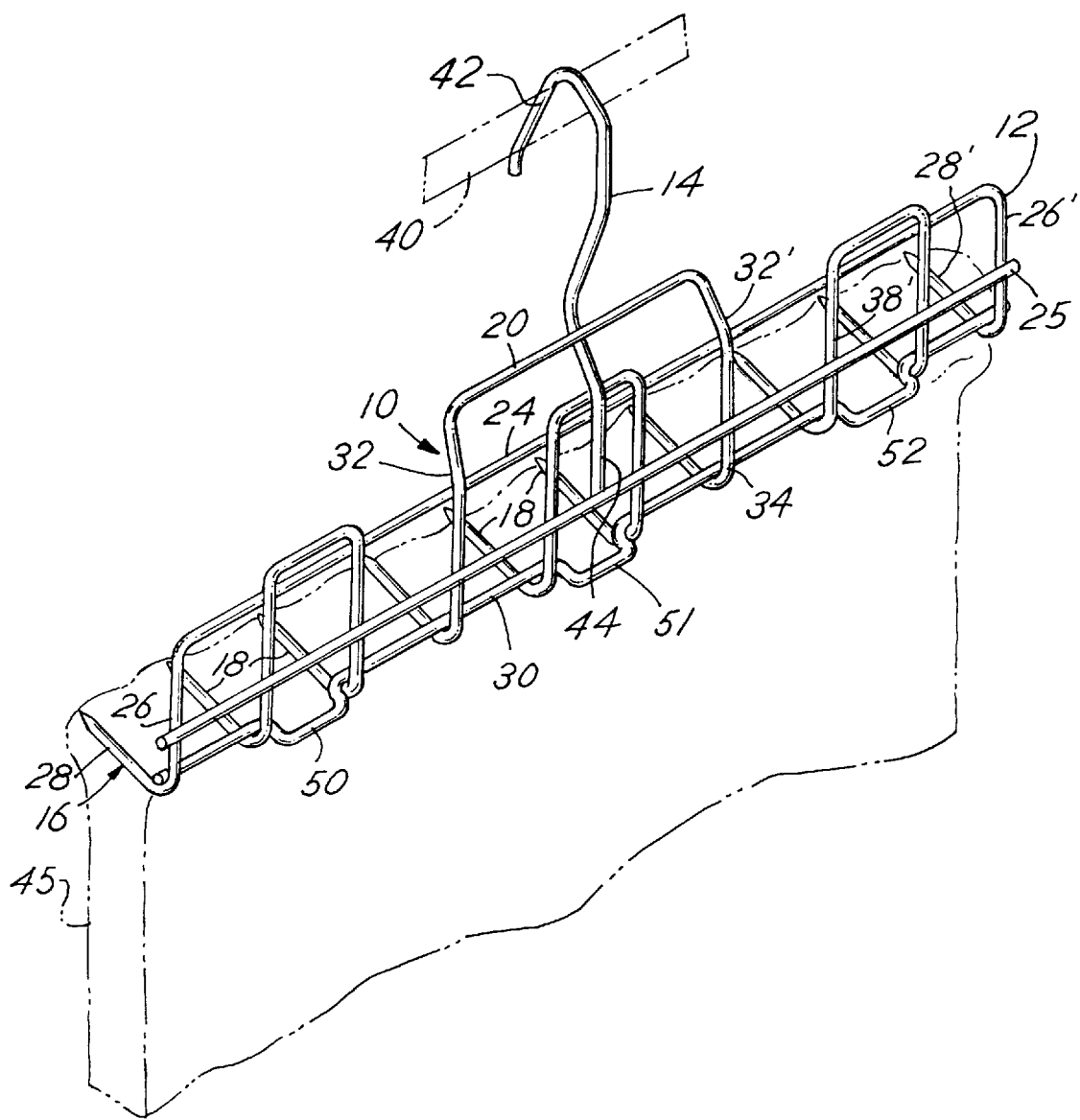
FIG. 3 is a perspective view of a second embodiment of the hanger structure.

FIG. 3 shows a second embodiment of the present invention. The hanger 10 of FIG. 3 is similar to that of FIG. 2, the only difference being that the bottom bar member 30 includes three separate offsets 50, 51, 52. The configuration of the bottom bar member 30 of FIG. 3 is designed to cooperate with a mechanical gripping device that uses an interface with three separate grippers for engaging each of the offsets 50, 51, 52 shown in FIG. 3. Of course, the hanger 10 of FIG. 3 can easily be used with a mechanical gripping device with one or two grippers. As is evident from FIGS. 2 and 3 a hanger can also be provided with other numbers of offsets. For example, two, four, or more offsets may be used depending on the number of grippers employed by the mechanical gripping device, the size of the hanger, and the size and type of meat product to be carried by the hanger.

Figure 4:
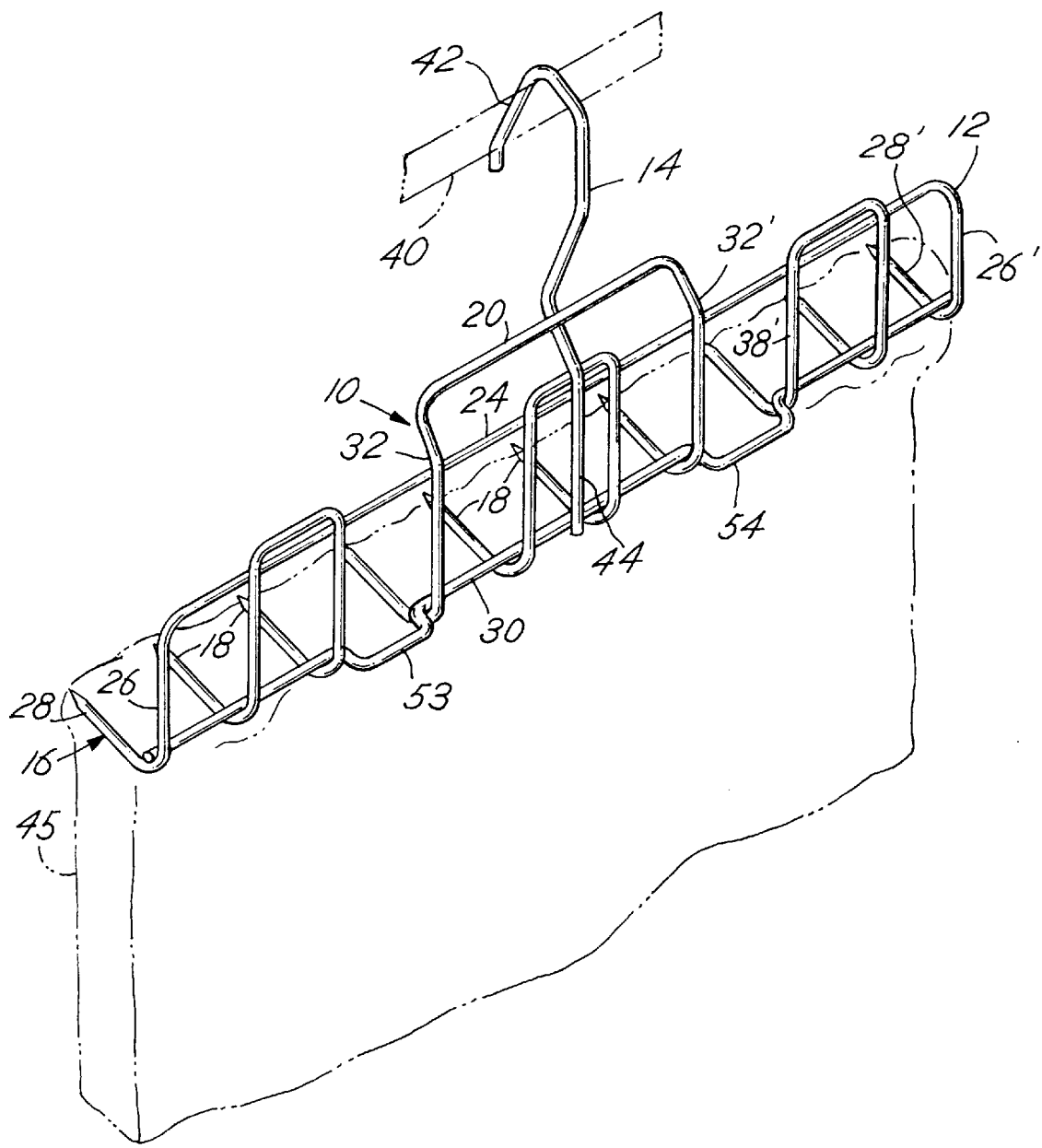
FIG. 4 is a perspective view of a third embodiment of the hanger structure.

FIG. 4 shows a third embodiment of the present invention. The hanger 10 of FIG. 4 is similar to those of FIGS. 2 and 3 but provides a configuration that eliminates crossbar 25 of FIGS. 2 and 3. As shown, leg formations 32, 32' attach to the backsides of top bar 24 and bottom bar member 30. Similarly, the U-shaped members that form the intermediate prongs 18 attach to the backsides of top bar 24 and bottom bar member 30. Terminal end section 44 of hook forming bracket 14 extends to bottom bar member 30 and is attached to the bottom bar member 30, preferably at the backside of bottom bar member 30. Bottom bar member 30 also includes offsets 53 and 54 for receiving a latch (not shown) of a mechanical gripping device (not shown).

Figure 5:
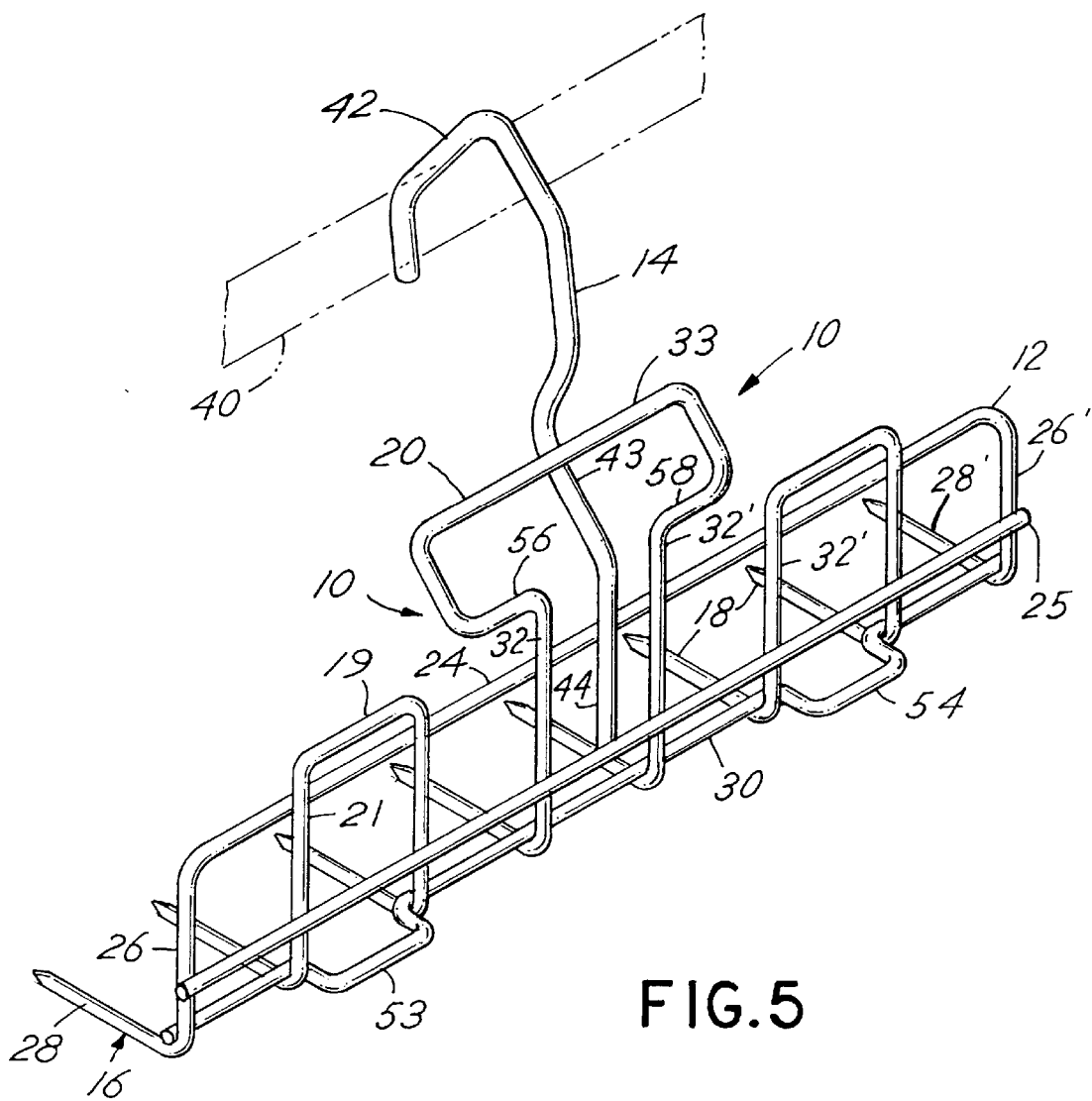
FIG. 5 is a perspective view of a fourth embodiment of the hanger structure.

FIG. 5 shows a fourth embodiment of the present invention. The hanger 10 of FIG. 5 has only eight prongs instead of the ten shown in the hangers of FIGS. 2–4. The construction of hanger 10 is similar to those shown in FIGS. 2–4 except that the middle U-shaped member 34 (FIGS. 2–4) is omitted. By omitting the middle U-shaped member, the hanger 10 is converted to an eight-prong hanger. The hanger 10 preferably has uniform spacing between the prongs 18. Accordingly, the hand-gripping member 20 is reconfigured so that the prongs of its leg formations 32, 32' will be the middle prongs 18 of prong assembly 16.

The hand-gripping member 20 is reconfigured in that its leg formations 32, 32' are provided with inwardly-extending segments 56, 58. In particular, leg formations 32, 32' extend from bight portion 33 in spaced, parallel relation. Inwardly-extending segments 56, 58 simply realign the leg formations 32, 32' so that the leg formations 32, 32' remain in parallel relation but the spacing between the leg formations 32, 32' is decreased to approximate the desired spacing between the prongs 18 of the prong assembly 16.

Regarding the hook-forming bracket 14 and its connection to the support frame 12, the terminal end section 44 is attached to the top bar 24, crossbar 25 (and if desired bottom bar member 30).

Bottom bar member can have one or more offsets. Hanger 10 of FIG. 5 illustrates an eight-prong hanger with two offsets 53, 54 configured for receiving a latch (not shown) of a mechanical gripping device (not shown).

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A hanger structure adapted for suspending a meat product during processing, the hanger structure comprising an elongate generally rectangular base frame adapted to be positioned in a generally vertical plane, the base frame having a meatside and a backside, the base frame being formed by a first bar member and a second bar member, the first bar member having an inverted U-shaped configuration and having a top bight forming portion and opposed spaced side leg members, the bight forming portion being spaced and generally parallel to the second bar member, the second bar member having ends, the ends connected to the meatside of the leg members, a plurality of members in the form of pointed prongs adapted to be pressed into engagement with the meat product, which prongs are spaced along the bottom edge of the base frame and are in a plane extending laterally of the meatside of the base frame, the second bar member having an offset extending in a plane generally normal to the plane of the base frame and laterally from the backside of the base frame.

2. A hanger structure as set forth in claim 1 wherein the leg members of the U-shaped first bar member on the base frame have terminal end portions shaped so as to form a pair of the pointed prongs.

3. A hanger structure as set forth in claim 1 wherein the prongs are arranged in pairs and the pairs of prongs are formed as terminal end sections of U-shaped rod members which have leg portions constituting a part of the base frame with the terminal end sections being bent at an angle to the plane of the base frame so as to extend in a common lateral plane.

4. A hanger structure as set forth in claim 3 wherein the second bar member is connected to the meatside of the U-shaped rod members at points between the ends.

5. A hanger structure as set forth in claim 4 wherein the offset of the second bar member extends from the backside of the rectangular base frame between the prongs of one of the U-shaped rod members.

6. A hanger structure as set forth in claim 1 wherein the hanger structure further includes a hook forming bracket that extends above the rectangular base frame and is attached to the first bar member and second bar member.

7. A hanger structure adapted for suspending a meat product during processing, the hanger structure comprising an elongate generally rectangular base frame adapted to be positioned in a generally vertical plane, the base frame having a meatside and a backside, the base frame being formed by a first bar member, a second bar member, and a middle bar member, the first bar member having an inverted U-shaped configuration and having a top bight forming portion and opposed spaced side leg members, the bight forming portion being spaced and generally parallel to the second bar member, the second bar member having first ends, the first ends connected to the leg members such that the second bar member is in spaced relation to the bight forming portion of the first bar member, the middle bar member having second ends, the second ends connected to the leg members such that the middle bar member is in spaced relation between the bight forming portion of the first bar member and the second bar member, a plurality of members in the form of pointed prongs adapted to be pressed into engagement with the meat product which prongs are spaced along the bottom edge of the base frame and are in a plane extending laterally of the meatside of the base frame, the second bar member having an offset extending in a plane generally normal to the plane of the base frame and laterally from the backside of the base frame.

8. A hanger structure as set forth in claim 7 wherein the leg members of the U-shaped first bar member on the base frame have terminal end portions shaped so as to form a pair of the pointed prongs.

9. A hanger structure as set forth in claim 7 wherein the prongs are arranged in pairs and the pairs of prongs are formed as terminal end sections of U-shaped rod members which have leg portions constituting a part of the base frame with the terminal end sections being bent at an angle to the plane of the base frame so as to extend in a common lateral plane.

10. A hanger structure as set forth in claim 9 wherein the first ends of the second bar member are connected to the meatside of the leg members of the first bar member and the second bar member is connected to the meatside of the U-shaped rod members at points between the first ends.

11. A hanger structure as set forth in claim 10 wherein the second ends of the middle bar member are connected to the backside of the leg members of the first bar member and to the backside of the leg portions of the U-shaped members.

12. A hanger structure as set forth in claim 11 wherein the leg portions of the U-shaped members are connected to the backside of the bight forming portion of the first bar member.

13. A hanger structure as set forth in claim 7 wherein the first ends of the second bar member are connected to the meatside of the leg members of the first bar member.

14. A hanger structure as set forth in claim 13 wherein the second ends of the middle bar member are connected to the backside of the leg members of the first bar member.

15. A hanger structure adapted for suspending a meat product during processing, the hanger structure comprising an elongate generally rectangular base frame adapted to be positioned in a generally vertical plane, the base frame having a meatside and a backside, the base frame being formed by a first bar member, a second bar member, and a middle bar member, the first bar member having an inverted U-shaped configuration and having a first bight forming portion and opposed spaced first side leg members, the second bar member having first ends, the first ends connected to the first side leg members such that the second bar member is in spaced parallel relation to the first bight forming portion of the first bar member, the middle bar member having second ends, the second ends connected to the first side leg members such that the middle bar member is in spaced parallel relation between the first bight forming portion of the first bar member and the second bar member, an inverted U-shaped rod member having a second bight forming portion and second side leg members, the second side leg members each having an angled intermediate section, a terminal end section, and a prong, the prong extending laterally from the meatside of the base frame, the second leg members attached to the first bar member, the second bar member, and the middle bar member, the intermediate section of the leg members angling above to the meatside of the base frame, a hook forming structure that includes a hook, a middle portion, and an end portion, the middle portion being connected to the second bight forming portion of the rod member, the end portion being connected to the middle bar member, the second bar member being attached to the meatside of the first side leg members and the second side leg members and having an offset extending in a plane generally normal to the plane of the base frame and from the backside of the base frame.

16. A hanger structure adapted for suspending a meat product during processing, the hanger structure comprising an elongate generally rectangular base frame adapted to be positioned in a generally vertical plane, the base frame having a meatside and a backside, the base frame having a first bar member, opposed side leg members, and a second bar member in spaced, parallel relation to the first bar member, the second bar member having an offset extending in a plane generally normal to the plane of the base frame and from the backside of the base frame, the second bar member having ends, the ends connected to the meatside of the opposed side leg members, the hanger having a plurality of prong members, each prong member including an extension attached to the first bar member and the backside of the second bar member, each prong member also including a prong for insertion into the meat product, the plurality of prong members defining a prong assembly, the prong assembly extending laterally from the meatside of the base frame.

* * * * *